US008310695B2

(12) United States Patent
Mukund et al.

(10) Patent No.: US 8,310,695 B2
(45) Date of Patent: Nov. 13, 2012

(54) INTEGRATED ADAPTABLE ACCOUNTING SYSTEM FOR A PRINT JOB

(75) Inventors: Vanditha Mukund, Penfield, NY (US); Kenneth James Buck, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1258 days.

(21) Appl. No.: 11/900,531

(22) Filed: Sep. 12, 2007

(65) Prior Publication Data

US 2009/0066995 A1 Mar. 12, 2009

(51) Int. Cl.
*G06F 3/12* (2006.01)
*G06K 15/00* (2006.01)
*G03G 21/02* (2006.01)
*G03G 15/00* (2006.01)

(52) U.S. Cl. ........... 358/1.15; 358/1.14; 399/79; 399/80

(58) Field of Classification Search ................. 358/1.14, 358/1.15; 399/79, 80
See application file for complete search history.

(56) References Cited

U.S. PATENT DOCUMENTS

| | | | | |
|---|---|---|---|---|
| 6,498,912 | B1 * | 12/2002 | Leni et al. | 399/79 |
| 6,583,888 | B1 | 6/2003 | Salgado et al. | |
| 6,597,469 | B1 * | 7/2003 | Kuroyanagi | 358/1.15 |
| 7,792,491 | B2 * | 9/2010 | Whitten | 455/66.1 |
| 2002/0027673 | A1 * | 3/2002 | Roosen et al. | 358/1.13 |
| 2002/0057452 | A1 | 5/2002 | Yoshino | |
| 2004/0125398 | A1 * | 7/2004 | Aiyama | 358/1.14 |
| 2005/0206949 | A1 | 9/2005 | Iseki et al. | |
| 2006/0251442 | A1 | 11/2006 | Fuqua et al. | |
| 2007/0070394 | A1 | 3/2007 | Ida et al. | |

OTHER PUBLICATIONS

European Search Report for EP 08 16 4107, dated Feb. 25, 2009.

* cited by examiner

*Primary Examiner* — Twyler Haskins
*Assistant Examiner* — Fred Guillermety
(74) *Attorney, Agent, or Firm* — Kermit D. Lopez; Luis M. Ortiz; Kevin Soules

(57) ABSTRACT

A system for accounting for a print job includes a print device having a database, and a server having a database. The print device and the server communicate via a network. The print device and/or the server have means for dynamically updating accounting information for the print job that communicates with the print device and the server via the network. The accounting information resides in the database of the print device and/or the database of the server. A method for accounting for a print job includes providing at least one print device having at least one database and at least one server having at least one database. The method includes communicating between the print devices and the servers via a network for dynamically updating accounting information for the print job stored on the databases of the print devices and/or the databases of the servers.

20 Claims, 8 Drawing Sheets

INTEGRATED ADAPTABLE ACCOUNTING SYSTEM FOR A PRINT JOB

CROSS-REFERENCE TO RELATED APPLICATIONS

This application is related to commonly owned and concurrently filed U.S. patent application Ser. No. 11/900,517 by K. J. Buck et al., entitled "LOCAL COST COMPUTATION ACCOUNTING FOR A PRINT JOB"; U.S. patent application Ser. No. 11/900,501 by K. J. Buck et al., entitled "LOCAL COST COMPUTATION ACCOUNTING FOR A PRINT JOB"; U.S. patent application Ser. No. 11/900,506 by K. J. Buck et al., entitled "DATA PROCESSING CARD BASED COPY BILL PAYMENT CAPABILITY"; U.S. patent application Ser. No. 11/900,503 by K. J. Buck et al., entitled "DATA PROCESSING CARD BASED COPY BILL PAYMENT CAPABILITY"; and U.S. patent application Ser. No. 11/900,502 by V. Mukund et al., entitled "DISTRIBUTED LIMIT-BASED ACCOUNTING FOR PRINT JOBS", the entire contents of each of which is incorporated by reference herein.

BACKGROUND

1. Technical Field

The present disclosure relates to accounting systems and methods, and more particularly, to accounting methods and machines for effecting accounting control for print jobs.

2. Description of Related Art

There are at least three recognizable independent dimensions or variables that have significant impact on accounting. Referring to FIG. 1, the three dimensions are location where authentication of user information takes place (X-axis); limitations of funds availability (Y-axis), and limitations on the number of images a user, e.g., a print job requester or an employer of a print job requester, can mark (Z-axis). As defined herein, marking refers to printing, copying, scanning, faxing or other similar action resulting in output of an image either as a hard copy or as an electronic record image.

Traditionally, accounting methods tend to address a subset of the dimensions. At a minimum, the three independent variables come into play, namely, where the authentication of the customer information takes place, e.g., at the X-axis and whether off-box at X1 or on-box at X2; whether the customer activity is limited by funds availability, e.g., at the Y-axis and has no pre-established limit, as at Y1 or has a pre-established limit, as at Y2; and whether the customer activity is limited by number of images the customer can mark, e.g., at the Z-axis and has no pre-established limit, as at Z1 or has a pre-established limit, as at Z2.

The conditions of off-box authentication at X1, a pre-established limit of funds at Y2, and no pre-established limit of number of images at Z1 exemplify a foreign device interface 10, e.g., a vending box. The conditions of off-box authentication at X1, together with no pre-established limit of funds at Y1 and no pre-established limit of number of images at Z1 exemplify a job-based accounting (JBA) system 12. In contrast, the conditions of on-box authentication at X2, together with no pre-established limit of funds at Y1 and a pre-established limit of number of images at Z2 exemplify an on-box authentication based accounting system 14.

SUMMARY

The present disclosure advances the field of systems and methods for accounting for print job usage quotas and limits. In particular, the present disclosure relates to a system for dynamically updating user information for a print job.

According to aspects illustrated herein, there is provided a system for accounting for a print job that includes at least one print device having at least one database and at least one server having at least one database, wherein the print device(s) and the server(s) communicate via a network. The one or more print devices and the one or more servers have means for dynamically updating accounting information for the print job. The means for dynamically updating communicates with the one or more print devices and with the one or more servers via the network. The accounting information resides in the one or more databases of the one or more print devices and/or in the one or more databases of the one or more servers.

One disclosed feature of the embodiments of the present disclosure is a method for accounting for a print job that includes providing at least one print device having at least one database and at least one server having at least one database; and communicating between the one or more print devices having at least one database and the one or more servers having at least one database via a network for dynamically updating accounting information for the print job stored on at least one of the one or more databases of the one or more print devices and the one or more databases of the one or more servers.

BRIEF DESCRIPTION OF THE DRAWINGS

Various embodiments of the present disclosure will be described herein below with reference to the figures wherein.

DETAILED DESCRIPTION

Figure 1:
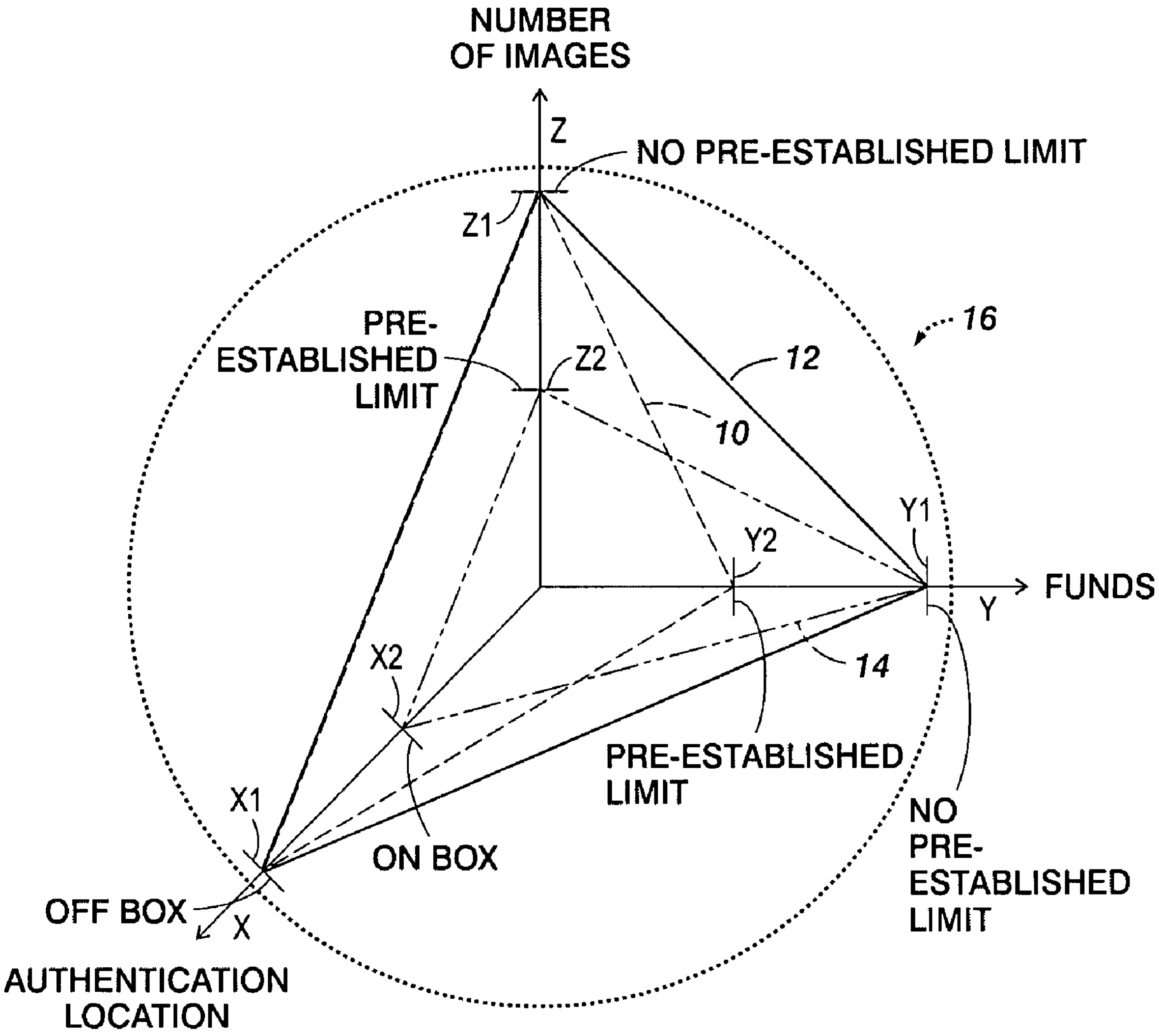
FIG. 1 is a diagram illustrating various parameters of the accounting system for a print job according to the present disclosure.

The present disclosure relates to a system for accounting for a print job wherein at least one database of a print device and at least one database of at least one server are dynamically updated for accounting information for the print job. A corresponding method is also disclosed.

As defined herein, a print device refers to a device that produces a print output, e.g., a copier, a scanner, a facsimile machine, a printer, a multifunction device (MFD) or other suitable image forming device. Alternatively, a print device refers to a device that produces a copy-to-file, a print-to-file, a scan-to-file, a facsimile-to-file, and a multifunction device or other suitable image forming device performing the same functions to file. A print device may include an internal processor capable of hosting a database, e.g., a master print device, a slave print device having at least one database, or a slave print device not having a database.

Also as used herein, the terms dynamically and dynamic refer to an action occurring at the time of need for the action to occur or for an object to be created, as opposed to the capability of the action occurring having been established or the object being created apriori. Also as used herein, means for dynamically updating accounting information for the print job include firmware, software and/or hardware for dynamically updating accounting information for the print job according to the definition of dynamic or dynamically defined herein.

The system level architecture of the integrated accounting system according to the present disclosure does not differentiate based on the location of the authentication mechanism; the actual location of this mechanism depends on the implementation. The discussion here is related to marked images. However, this logic is pertinent to exported images as well; wherein the marking aspect of the logic is replaced by the appropriate export logic.

The present disclosure integrates existing methods of accounting with new logic to enable an integrated or unified adaptable accounting system. The present disclosure relates to dynamic updating of the accounting database and a notion of using authentication and authorization information to dynamically create temporary accounts as needed, dynamically update the user's privileges, and ensuring that every page marked is accounted for irrespective of the underlying monitoring mechanism used.

The requirements along all three dimensions of authentication (the X-axis), funds availability (the Y-axis) or image counting (the Z-axis) in a real-time or as-required or as needed basis indicate the approach to be adopted for accounting. Thus the system and method according to the present disclosure rely on a concept of dynamic update of user information, namely accounting information, database as well as easier administration of the database due to changeable parameters being stored in easily accessible lists. The method separates the authentication and authorization activity from the purely accounting activity. A separate authentication activity allows for the use of different authentication mechanisms and integration of network identity. A separate authorization activity allows for dynamic update of authorized capabilities and limits on number of transactions (such as pages copied, pages printed, color pages copied, etc.) allowed for each user. The system and method of the present disclosure also allow for external accounting systems (EAS) to supply variable limits and authorized services for external users, and ensure that every page marked or printed, scanned, faxed, etc. gets recorded, and encompasses all three dimensions and limits X1, Y1 and Z1, as indicated by the circle 16.

Depending on where the authentication database exists, the authentication will take place either off-box (an authentication database is located on a network entity different from the print device) or on-box (an authentication database is located on the print device). Higher-end print devices are likely to have on-board accounting databases and can support on-box authentication as well; however, lower-end print devices may rely on off-box accounting databases and off-box authentication. Generally, off-box authentication is associated with an EAS, e.g., Equitrac Office 4 (Equitrac, Inc, Plantation, Fla., USA). Off-box authentication relates to workflows associated with current job based accounting (JBA) and foreign device interface (FDI). On-box authentication relates to on-box accounting systems such as Xerox Standard Accounting (XSA, Xerox Corp. Stamford, Conn. USA).

The integration of discrete, mutually exclusive accounting mechanisms into a single, dynamically selectable accounting mode, complete accounting system that is dynamically updatable (accounting database is dynamically updatable) is the focus of the present disclosure.

The dynamically selectable accounting mechanism is based on user input, e.g., whether the controls are funds based, quota based or location of accounting database based, as well as based on the concept of dynamically being able to update the accounting database, both in terms of creating temporary/new accounts as well as updating the authorization controls on existing accounts.

As depicted in the flowcharts, different types of accounting customers, e.g. self-serve, enterprise, office departmental, can be supported by this mechanism. The determination of the accounting mode that is applicable is made dynamically. In the flowcharts, upon entry of user identity and indicator of location of authentication database, the appropriate authentication mechanism is launched—off-box (server based) or on-box (local to print device, e.g., MFD). The case of off-box authentication also simulates FDI, where the deposit of money corresponds to authentication. Upon valid off-box authentication, the print device requests the amount of funds, cost model (how cost of service should be computed) and authorized services (which services the user is authorized to use) from the external authentication database. If the funds available are finite, the applicable accounting mechanism is FDI. A self-serve account is created a priori in the local accounting database. Page activity is recorded in this account as well as the overall system account (existing a-priori in accounting database and has all user accounts associated with it), thereby ensuring that all page activity is accounted for. The FDI activity takes place with the cost model that was provided. If the funds available are unlimited, the expectation is that the external authentication corresponds to an EAS as previously mentioned above. In this situation a temporary account is created in the local accounting database with the authorized services and limits (if any) provided by the EAS. Once again, the creation of the temporary account allows for the counting of all page activity related to this method of accounting, namely Job Based Accounting, on both the temporary account and the system account. The temporary account can be deleted when the data has been transferred over to the EAS. Finally, if the authentication was locally located (on the print device), upon authentication by the device, the print device requests for authorization details for the user from the print device authentication database, and updates the limits and authorized services associated with the user's account in the accounting database. In reality these two databases could be collapsed into one. The separation is being maintained here to better explain the logic. This separate request for authorization information allows for dynamic update of the user's rights and quotas (via access control lists and limit tables) without having to go into each user's account to modify the rights and quotas. This capability to dynamically update the database is one of the novel and unobvious concepts presented herein.

Figure 2:
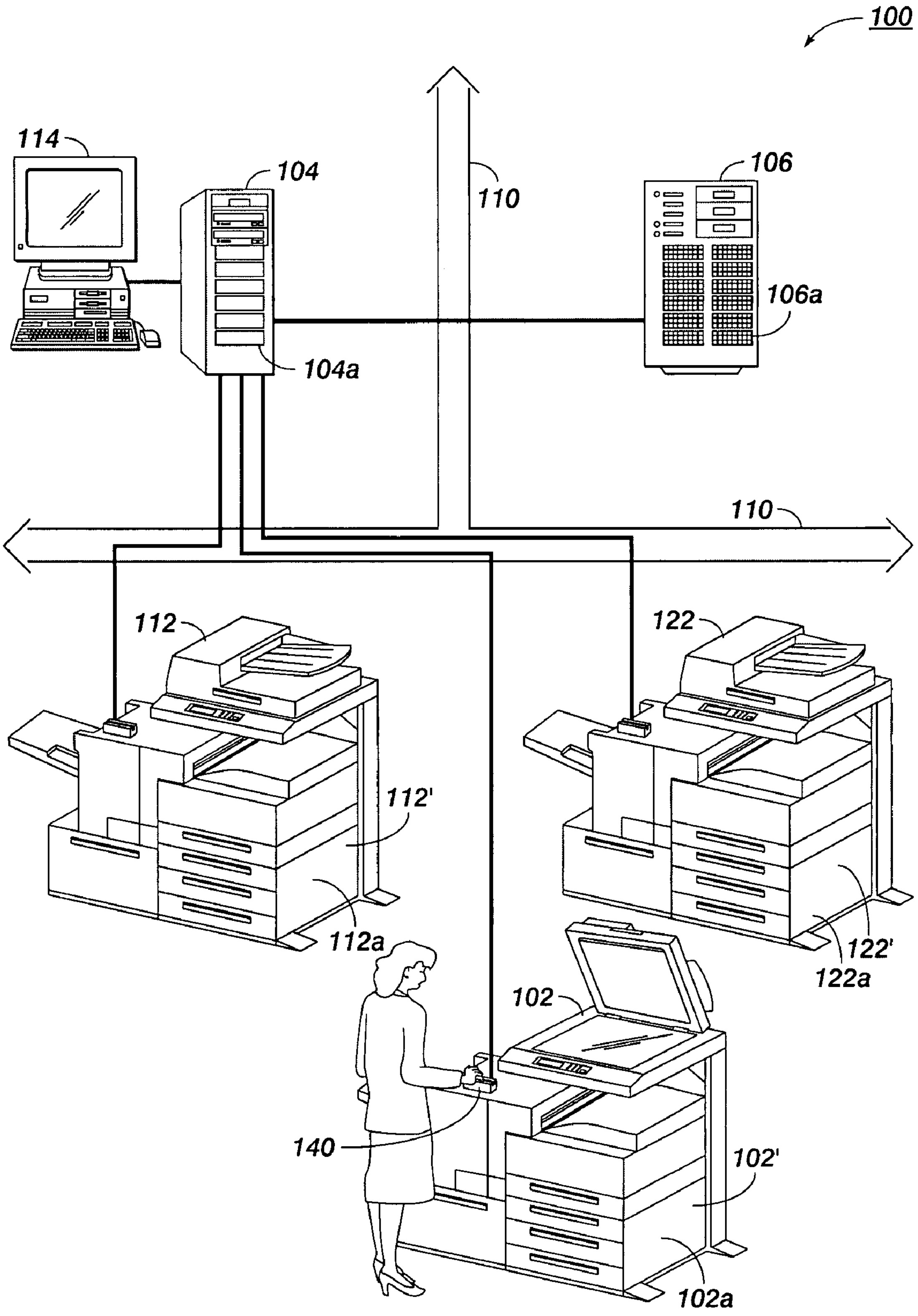
FIG. 2 is a schematic diagram of a general overview of the accounting system for a print job according to the present disclosure.
Figure 3:
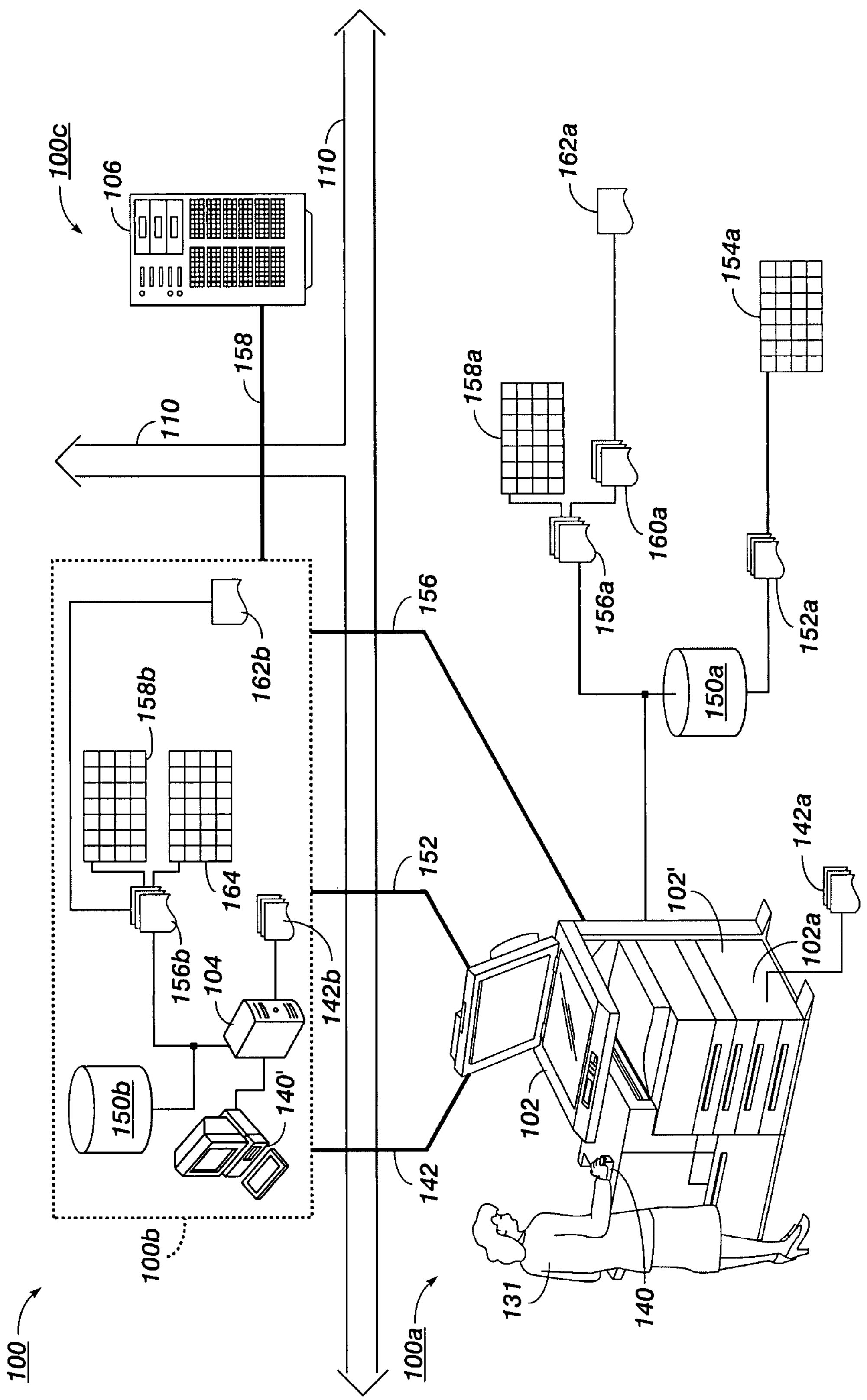
FIG. 3 is a schematic diagram of detailed aspects of the accounting system for a print job of FIG. 2.
Figure 4:
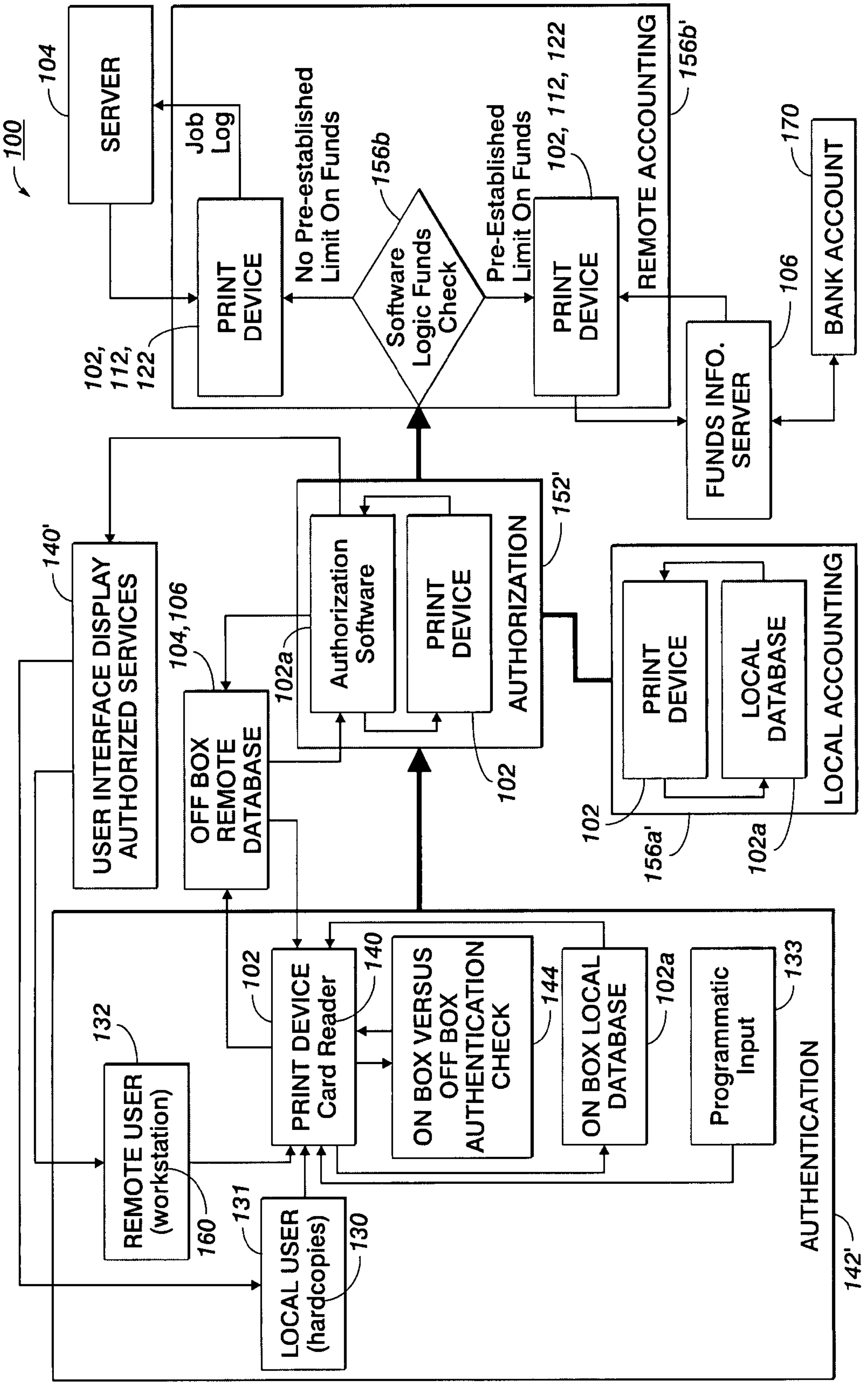
FIG. 4 is a work flow diagram of the accounting system of FIGS. 2 and 3 for implementation of an accounting method for a print job according to the present disclosure.

Referring particularly now to FIGS. 2-4, there is disclosed a system for accounting for a print job according to the present disclosure. More particularly, as illustrated in FIG. 2, system 100 includes at least one print device, e.g., print devices 102, 112, and 122 having at least one database, e.g., databases 102*a*, 112*a*, and 122*a*, respectively. (For simplicity, reference to print device 102 is interpreted to mean at least one print device, e.g., print device 102, and/or print device

112, and/or print device 122 or additional print devices). In addition, reference to other components or functions associated with print device 102, e.g., print device processor 102', is interpreted to mean the analogous component or function of print device 112, e.g., print device processor 112' or of print device 122, e.g., print device processor 122').

The system 100 includes also at least one server, e.g., an EAS or partner server 104 or a funds server 106 having at least one database, e.g., partner or EAS database 104_a_ or funds server database 106_a_, respectively. The database e.g., database 102_a_ of print device 102, database 112_a_ of print device 112 and database 122_a_ of print device 122, and the at least one database of the at least one server, e.g., EAS database 104_a_ of EAS or partner server 104 or funds database 106_a_ of funds server 106, are dynamically updated for accounting information for the print job. The server databases 104_a_ and/or 106_a_ may coexist on the same server but are otherwise described as separate databases herein.

The print devices 102, 112, and/or 122, may communicate with the at EAS or partner server 104 and/or funds server 106 via a network 110 for dynamically updating accounting information for the print job by print devices 102, 112 and/or 122, and the EAS or partner server 104 and/or partner server 106, dynamically creating a user account. A network administration mechanism 114, e.g., a browser, may interface with the network 110 to administer interfacing between the EAS or partner server 104, the funds server 106, and the print devices 102, 112 and/or 122.

As particularly illustrated in FIG. 3, the functions of the system 100 may be implemented via either a print device sub-system 100_a_, an EAS or partner server sub-system 100_b_ or a funds sub-system 100_c_. Via the print device sub-system 100_a_, a local user 131 may approach a print device, e.g., print device 102, to swipe a card (not shown) at a card reader or other suitable type of reader appropriate for the type of card, e.g., a smart card or an EAS or RFID card or other suitable card capable of performing the necessary functions or inputting to a user interface 140 to request authorization for a print job. The inputting to user interface 140 to request authorization for a print job may also be initiated by a non-card based mechanism, e.g., a mobile phone or other suitable wireless device. A user authentication software module 142_a_ residing in the print device 102 may interface via the network 110 through an authentication interface 142 with a user authentication software module 142_b_ residing in the EAS or partner server 104 of EAS sub-system 100_b_ to verify, i.e., authenticate, that a user is an allowed user. Implementation of the user authentication software module 142_a_ involves verifying if the authentication database is "off-box" or "on-box" and appropriately communicating with a remote database residing on EAS partner server 104 or funds server 106 and checking validity of at least one credential or authenticating on the local print device 102.

Since the print device(s) 102, 112 and/or 122 is/are operatively coupled to a software decision module 144 that determines whether the authentication database is "on-box" or "off-box" (see FIG. 4), upon swiping the card at the card reader or inputting to the user interface 140, and verifying authentication via the EAS or partner server 104 in the case of "off-box" authentication or via the print device 102 in the case of "on-box" authentication, the sub-system 100_a_ transfers to authorization software module 152_a_ that is linked to print device account database 150_a_ and to an authorized services access control list (ACL) 154_a_. The authorized services access control list or ACL identifies the services such as print, copy, facsimile, scan, or other similar service permitted to a user. An accounting software module 156_a_ is also linked to the print device account database 150_a_ and to a limit computation module 160_a_ that implements a particular user cost model 162_a_ based upon a limits table 158_a_.

Correspondingly, the print device authorization software module 152_a_ may interface via the network 110 through an authorization interface 152 with an EAS accounting software module 156_b_ residing in the EAS or partner server 104. In addition, the print device accounting software module 156_a_ may interface via the network 110 through an accounting interface 156 with an EAS accounting software module 156_b_ residing in the EAS or partner server 104. The EAS accounting software module 156_b_ is also linked to an EAS account database 150_b_ and to a limits table 158_b_ that implements a particular user cost model 162_b_ based upon the limits table 158_b_. In addition, the EAS accounting software module 156_b_ is also linked to an authorized services table 164.

Furthermore, the EAS or partner server 104 residing in the sub-system 100_b_ may interface via the network 110 with the funds server 106 residing in the sub-system 100_c_ through a partner funds server interface 158.

FIG. 4 illustrates the system 100 during implementation of the unified or integrated accounting method of the present disclosure. The system 100 may be configured of several software function modules. In particular, user authentication function module 142' is first implemented at print device(s) 102, 112 and/or 122. The print device(s) 102, 112 and/or 122 are operatively coupled to a software module 144 that checks whether an authentication database is located on-box or off-box. Following implementation of user authentication function module 142', user authentication function module 142' interfaces with a user authorization function module 152' which is implemented to authorize the print job. Upon implementation of the user authorization function module 152', the user authorization function module 152' interfaces with either a local accounting function module 156_a_' or a remote accounting function module 156_b_'.

The user authentication function module 142' is implemented via a local user 131, having print job originals 130 to be copied via the print device 102, 112 and/or 122, swiping the card at the card reader or inputting information at user interface 140. Alternatively, a remote user 132 at a terminal 160 that is linked to the print device(s) 102, 112 and/or 122 may send a print job thereto. Authentication of the remote user 132 occurs via information input at the terminal 160. In yet another alternative embodiment, a programmatic input user 133, e.g., a mainframe computer, that is also linked to the print device(s) 102, 112 and/or 122, may send a print job thereto. Authentication of the programmatic input user 133 occurs via information transmitted to the print device(s) 102, 112 and/or 122 therefrom.

The print device 102, 112 and/or 122 performs an "On Box" versus "Off Box" authentication check via implementation of authentication function module 144 to determine whether the authentication database is an "On Box" or local database 102_a_ residing on the print device(s) 102, 112 and/or 122 or whether the authentication database is an "Off Box" remote database 104, 106 residing outside of the print device (s) 102, 112 and/or 122. Once authentication of the user 131, 132 or 133 has occurred, the user authorization function module 152' is implemented. Authorized services for the particular user may be displayed on a graphical user interface 140'. Following implementation of the authorization function module 152', either local accounting function module 156_a_' or remote accounting function module 156_b_' are implemented. The local accounting function module 156_a_' is implemented via the print device(s) 102, 112, and/or 122. The remote accounting function module 156_b_' is implemented by the print device(s) 102, 112, and/or 122 communicating with the EAS partner server 104 and/or the funds partner server 106 executing the EAS accounting software module **156*b* to query an account residing at a financial institution 170** in the case where the user account has a pre-established limit.

Referring to FIGS. 2-4, the print device(s) 102, 112, and/or 122 communicates with the server, e.g., EAS or partner server 104 or funds server 106 via the network 110 At least one of print devices 102, 112, and/or 122, and/or the server 104 and/or 106 dynamically creates as the user account a temporary account included within at least one user account database wherein the at least one user account database is one of the database(s) **102*a*, 112*a* and/or 122*a* of the print device(s) 102, 112, and/or 122, and the database(s) 104*a* and/or 106*a* of the server 104 and/or 106. In a similar manner, communication occurs via the network 110 wherein print device(s) 102, 112, and/or 122 and the server(s) 104 and/or 106 dynamically separate user authentication from user authorization included within at least one user account database. The user account database may be one of the databases 102*a*, 112*a* and/or 122*a* of print devices 102, 112, and/or 122, respectively, and/or databases 104*a* and/or 106*a* of the server 104 and/or 106**, respectively.

In yet still another aspect of the present disclosure, communication occurs similarly via the network 110 wherein at least one print device 102, 112, and/or 122 and/or the server 104 and/or 106 authenticate user information associated with the accounting information and at least one of dynamically requesting an amount of funds to initiate the print job be made available to the system, dynamically identifying cost of services for the print job, and dynamically identifying authorized services associated with the user account corresponding to the print job. Authorized services may include but are not limited to copy, print, fax, scan, or other similar action or service.

Communication may similarly occur with the network 110 for dynamically updating accounting information of a user account for the print job via at least one of the print device(s) 102, 112, and/or 122, and/or the server 104 and/or 106 performing dynamic setting of user privileges corresponding to the user account. "Dynamic" setting of user privileges may include setting permissions to copy, print, fax, use color, scan set/reset limits or other similar service or action.

In another aspect of the present disclosure, communication may similarly occur with the network 110 for dynamically updating accounting information for the print job via at least one of the print device(s) 102, 112, and/or 122 and/or the server 104 and/or 106 performing dynamic updating of at least one user account database. The user account database is one of the databases **102*a*, 112*a* and/or 122*a* of print devices 102, 112, and/or 122, respectively, and/or the at least one database of the server, e.g., databases 104*a* and/or 106*a* of the server 104 and/or 106**, respectively. Dynamic updating of at least one account user database may include but are not limited to update limit, update usage (for as many services authorized).

Furthermore, communication may similarly occur with the network 110 for dynamically updating accounting information for the print job via at least one print device(s) 102, 112 and/or 122 and the server(s) 104 and/or 106 dynamically billing to at least one user account database, wherein the user account database is one of the databases **102*a*, 112*a* and/or 122*a* of print devices 102, 112, and/or 122, respectively, and/or the databases 104*a* and/or 106*a* of the server 104 and/or 106**, respectively. Dynamically billing to at least one user account database may include but is not limited to number of pages printed, copies made, color copies made, etc.

Communication may again occur via the network 110 via at least one of the print device(s) 102, 112 and/or 122 and the server 104 and/or 106 dynamically restricting dynamic billing to premium services associated with at least one user account database, wherein the user account database is one of the databases **102*a*, 112*a* and/or 122*a* of print devices 102, 112, and/or 122, respectively, and/or databases 104*a* and/or 106*a* of the server 104 and/or 106**, respectively. Dynamic billing to premium services associated with at least one user account database may include but are not limited to large size paper, color paper, color printing, duplex printing, stapling, hole punching, etc.

Still further, communication may similarly occur via the network 110 via at least one of the print device(s) 102, 112 and/or 122 and the server 104 and/or 106 dynamically restricting implementation of the print job to premium services associated with at least one user account database. The user account database is one of the database(s) of the print device, e.g., databases **102*a*, 112*a* and/or 122*a* of print devices 102, 112, and/or 122, respectively, and/or the database of the server, e.g., databases 104*a* and/or 106*a* of the server 104 and/or 106**, respectively. Dynamically restricting implementation of the print job to premium services associated with at least one user account database may include, for example, but are not limited to restricting color copies, restricting paper size or quality, or other similar premium services described above.

Yet again, communication may occur similarly via the network 110 via at least one of the print device(s) 102, 112 and/or 122 and the server 104 and/or 106 dynamically counting page activity for the print job, with the page activity being associated with the temporary account. Counting page activity may include counting of printed material output by the print device(s) 102, 112 and/or 122, e.g., not limited to prints, copies, facsimiles or other similar output.

FIGS. 5 through 8 illustrate logic flow diagrams for a method 200 of implementing a unified adaptable accounting system for print jobs according to the present disclosure. First referring to FIG. 8 in conjunction with FIGS. 2-4, method 200 includes a system 100 wait condition 262 of waiting for the next user. Initiation of a print job begins with system initial condition step 204. System initial condition step 204 includes a sub-step **204*a* of a-priori creating an account of the type "Self Service exists on Print Device with associated authorized services" (created on the print device 102 and/or 112 and/or 122) and/or a sub-step 204*b* of a-priori creating a Count Limit table, e.g., such a table 158*a* already resides in the print device 102, 112 and/or 122 and/or a sub-step 204*c*** of a-priori creating relevant groups such as, for example, "Dept A', Dept B", "External", etc.

(For simplicity, reference to print device 102 is interpreted to mean at least one print device, e.g., print device 102, and/or print device 112, and/or print device 122 or additional print devices. In addition, reference to other components or functions associated with print device 102, e.g., print device processor 102', is interpreted to mean the analogous component or function of print device 112, e.g., print device processor 112' or of print device 122, e.g., print device processor 122').

The system 100 wait condition further includes step 206 of inputting user data via an enabled mechanism, e.g., a data processing card swiped or read by a card reader at user interface 140. Following step 206 of inputting the user data, step 208 is implemented of authenticating the user via an appropriate mechanism, e.g., via print device 102 or external accounting system (EAS) server 104. Decision step 210 is then implemented of determining whether the user identification has been authenticated remotely or externally via the EAS server 104 or whether the user has been authenticated locally or internally, e.g., via print device 102.

If the user identification has been authenticated remotely or externally via the EAS server 104, step 212 is implemented of the EAS server 104 supplying user identification credentials to the print device 102. Step 214 is then implemented of the print device 102 then displaying a "Valid" message to the user 131 at the user interface 140, or to the user 132 at terminal 160, or allowing use of the print device 102 by the programmatic input user 133 and transferring operation via continuation point A (see FIG. 5).

Figure 7:
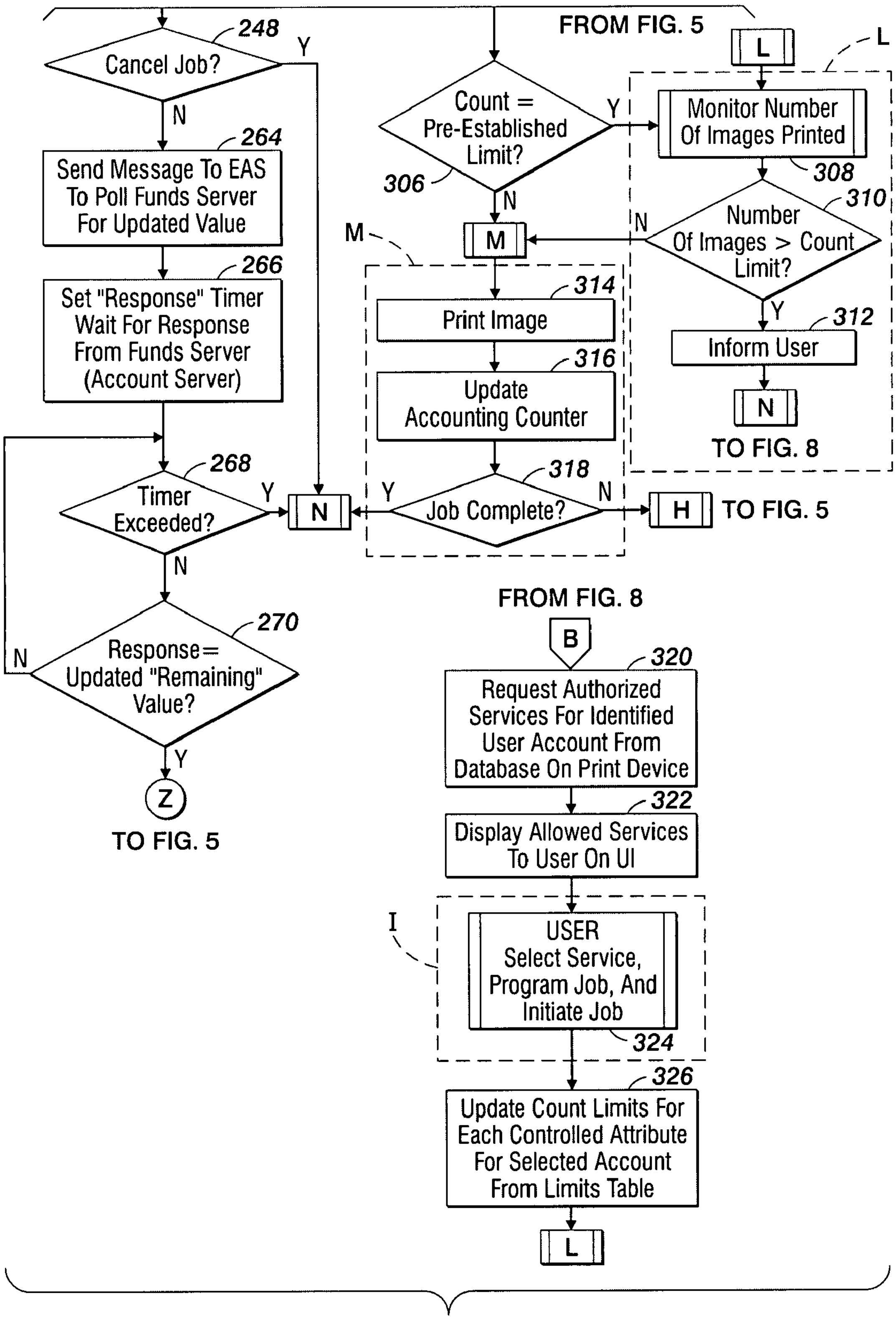
FIG. 7 is a continuation of the logic flow diagrams for the method of operation of the accounting system for a print job of FIGS. 5 and 6.
Figure 8:
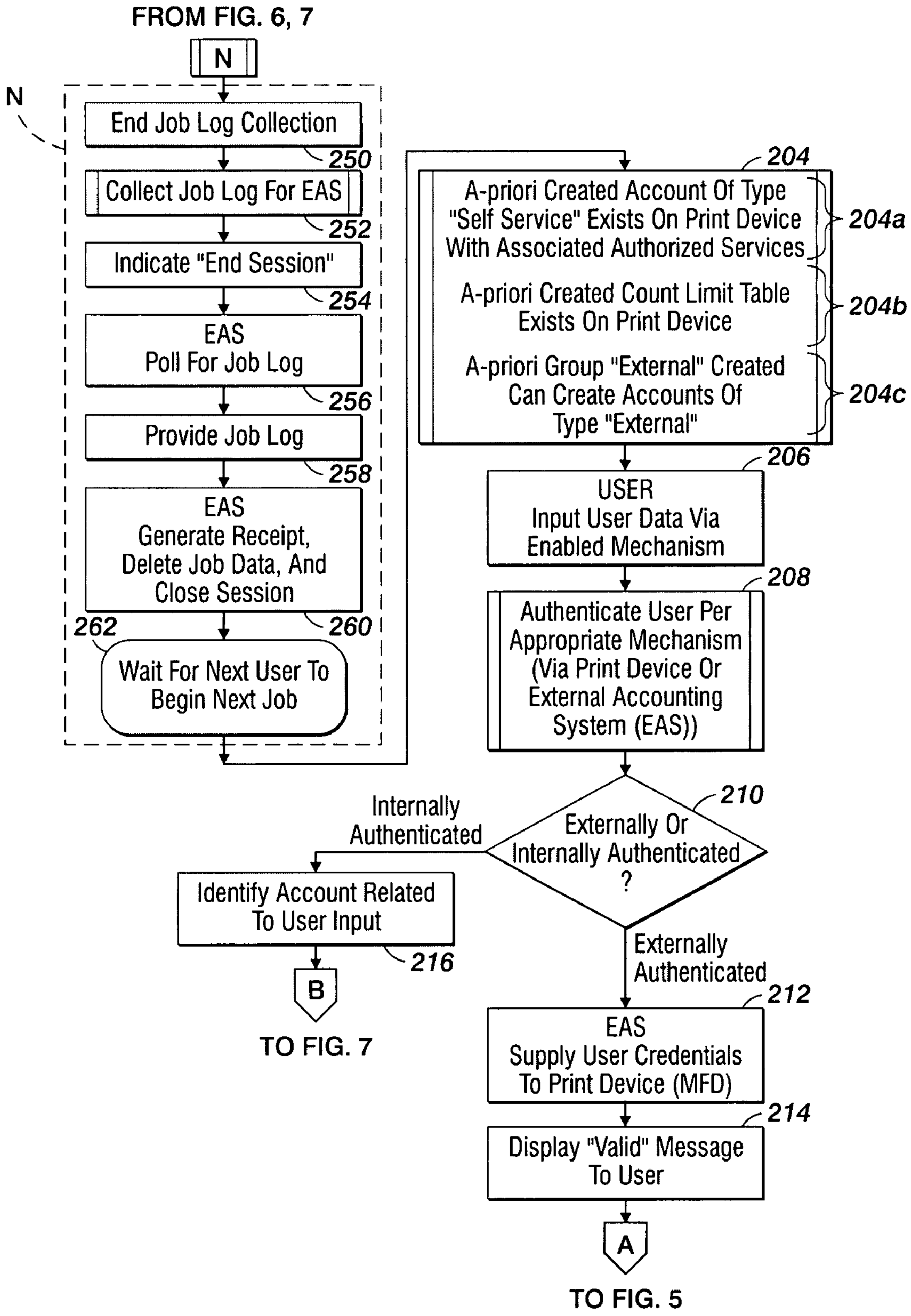
FIG. 8 is a continuation of the logic flow diagrams for the method of operation of the accounting system for a print job of FIGS. 5, 6 and 7.

Returning to decision step 210, if the user identification has been authenticated locally or internally, e.g., via print device 102, then step 216 is implemented of the print device identifying the account related to, or corresponding to, the user input and transferring operation via continuation point B (see FIG. 7).

Figure 5:
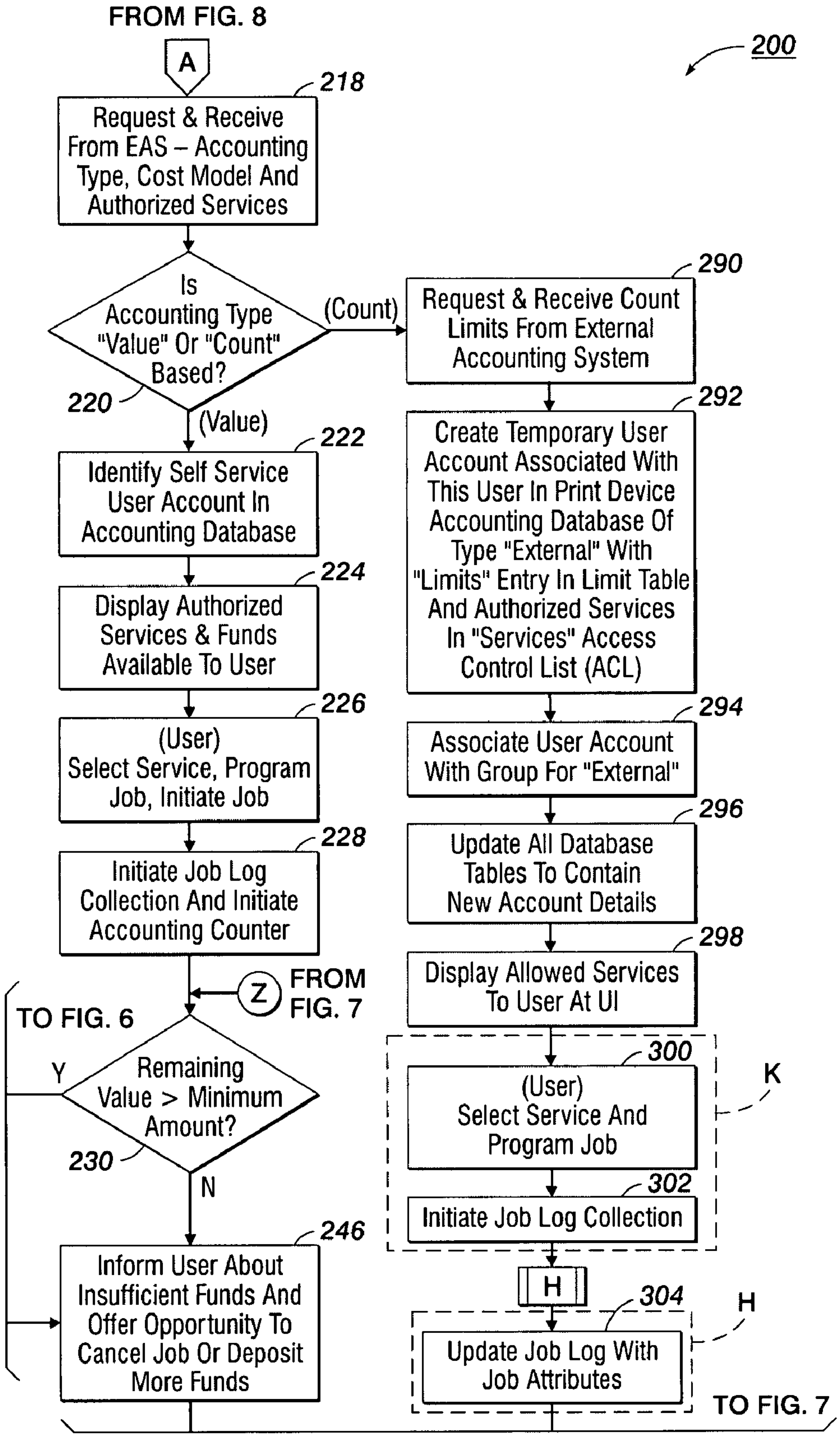
FIG. 5 is a logic flow diagram for the method of operation of the accounting system for a print job according to the present disclosure.

Now referring to FIG. 5, if the user identification has been authenticated externally via continuation point A, then step 218 is implemented of print device processor 102' and/or print device processor 112' and/or print device processor 122' requesting and receiving from the EAS server 104 the accounting type, cost model and authorized services for the particular user 131, 132, or 133. Decision step 220 is then implemented of determining whether the accounting type is a "value" (e.g., financial limit, etc.) based account or a "count" (e.g., number or type of copies, etc.) based account. If it is determined that the account type is a "value" based account, step 222 is implemented of identifying a self service user account in the accounting database 150*a* (see FIG. 3).

Step 224 is then implemented of displaying, e.g., via user interface 140', authorized services and funds available to the local user. Following step 224, step 226 is implemented of the user 131 (explicit selection), 132, or 133 (implicit selection) selecting the type of service requested, programming a print job and initiating the print job. Subsequently, step 228 is implemented of the print device processor 102' initiating a job log collection and initiating an accounting counter via print device accounting software 156*a*. Following step 228, decision step 230 is implemented of determining whether the remaining value associated with the user account is greater than the minimum amount required to complete the print job.

Figure 6:
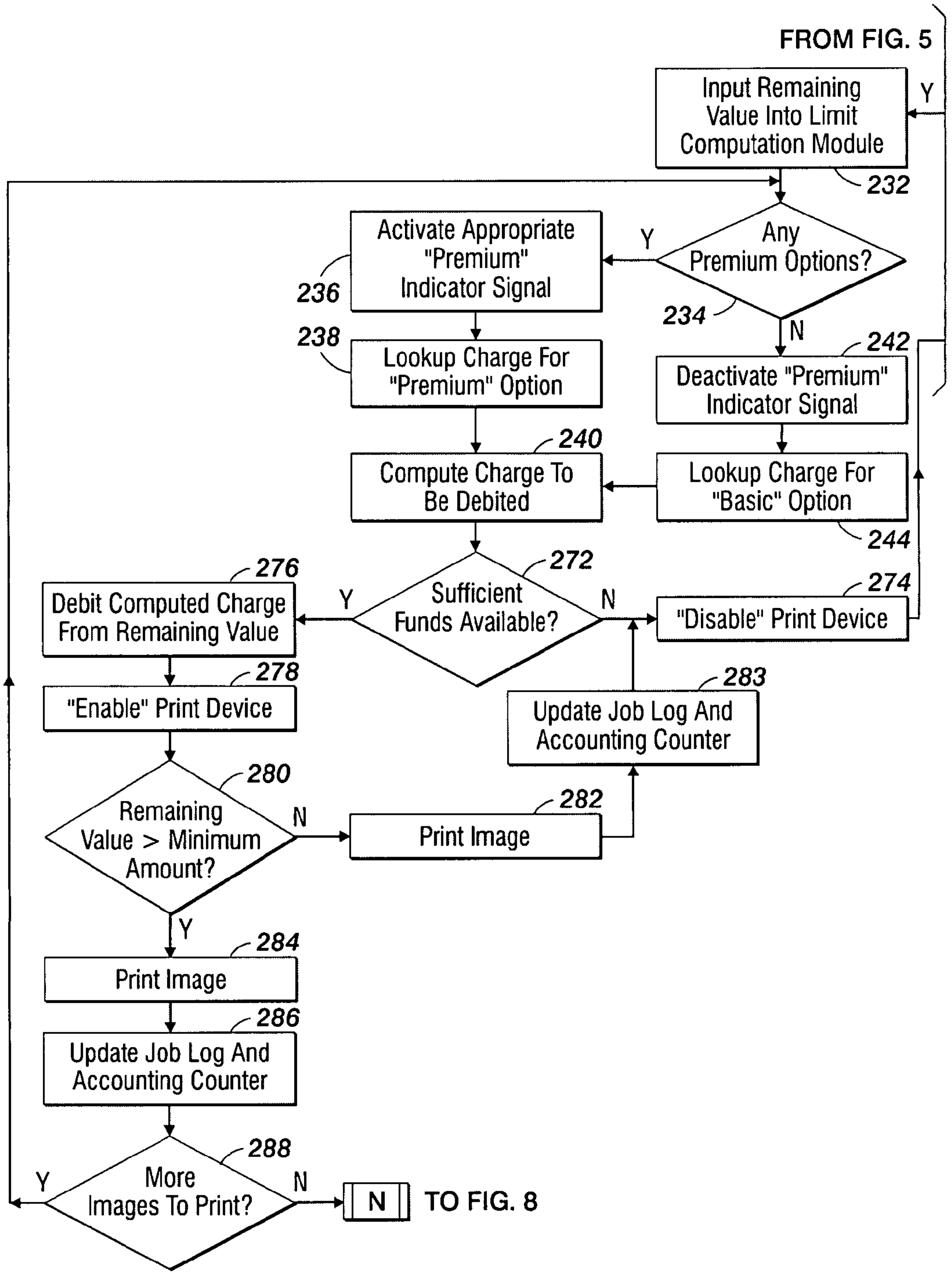
FIG. 6 is continuation of the logic flow diagram for the method of operation of the accounting system for a print job of FIG. 5.

If yes, referring to FIG. 6, step 232 is implemented of inputting the remaining value associated with the user account into the limit computation module 160*a*. Following step 232, decision step 234 is implemented of determining whether there are any premium options associated with the user account. If yes, step 236 is implemented of activating an appropriate premium signal or premium indicator, referred to herein as a premium indicator signal, e.g., paper size, paper type, color copy, duplex, stapled, etc. after which, step 238 is implemented of looking up value charges, e.g., on the print device cost model 162*a* or the EAS server cost model 162*b*, for the premium option and step 240 is implemented of computing the value charge to be debited to the associated account via the cost model 162*a* or 162*b*.

Returning now to decision step 234, if there are no premium options associated with the print job, step 242 is implemented of deactivating the premium indicator signal. Step 244 is then implemented of looking up a charge on cost model 162*a* or 162*b* for a "basic" option, after which step 240 is implemented of computing the charge to be debited to the associated user account, e.g., via computation module 160*a*. In effect, the system 100 transfers to a default condition of enabling basic services at basic prices. A further default condition may be wherein the system 100 is configured to assume that new or additional funds have been deposited and accounted for by the accounting software module 156*a* or 156*b*.

Returning now to FIG. 5 illustrating decision step 230 of determining whether the remaining value associated with the user account is greater than the minimum amount required to complete the print job, wherein it is determined that the remaining value associated with the user account is not greater than the minimum amount, step 246 is implemented of informing the user 131, 132, or 133 about insufficient funds available in the associated account and offering the user 131, 132, or 133 an opportunity to cancel the print job or deposit sufficient funds into the associated account. Step 246 is implemented by assuming first that the user 131, 132, or 133 has deposited new funds.

Referring to FIG. 7, decision step 248 is then implemented of determining whether the user wishes to cancel the print job via the user interface 140'. If yes, referring also to FIG. 8, job cancellation condition N is implemented that includes step 250 of ending job log collection actions. Step 252 is then implemented of collecting the job log for the EAS server 104 followed by step 254 of print device processor 102' indicating "end of session" and being displayed on the user interface 140'. Step 256 is then implemented of polling for the job log, e.g., EAS server 104 polling the print device 102 for the job log. Step 258 is then implemented of providing the job log, e.g., the print device 102 providing the job log to the EAS server 104. Step 260 is then implemented of the EAS server 104 generating a receipt, deleting job data, and closing the print job session and transferring to step 262 of waiting for the next print job request. Steps 250, 252, 254 256, 258, 260 and 262 are illustrated as being included within job cancellation condition N.

Returning to decision step 248 in FIG. 7, if it is determined that the user does not wish to cancel the print job request, step 264 is implemented of sending a message to poll for an updated "remaining funds" value, e.g., print device 102 to the EAS server 104 to poll the funds server (processor) 106. Step 266 is then implemented of setting a "response" timer time limit to wait for a response, e.g., a response timer residing on the print device 102, regarding an updated value for the user account indicating that the user 130, 131 or 132 has deposited sufficient monetary value or funds to the account to cover the minimum cost to implement the print job request.

Following step 266, decision step 268 is implemented of determining, if the time limit of the response timer has been exceeded for the user 131, 132 or 133 to add more financial value to the associated account. If yes, the job cancellation condition N (see FIG. 8) is implemented which includes steps 250 through 262 as described above. If no, returning to FIG. 7, decision step 270 is implemented of determining if the response from the funds server 106 indicates that remaining value in the associated account has been updated. If yes, the system 100 transfers via continuation point Z back to decision step 230 (see FIG. 5) wherein it is again determined, e.g., via the EAS server 104, if the remaining value of the user account is greater than the minimum amount required to complete the print job request.

If no, the system 100 transfers back to decision step 268 (see FIG. 7) wherein it is again determined, e.g., via EAS server 104, if the time limit of the response timer has been exceeded for the user 131, 132 or 133 to add more financial value to the associated account. In step 246 (see FIG. 5), the user has been informed that he/she is out of funds. Until the user decides to deposit more funds or cancel the print job, the system 200 remains in decision step 248 (see FIG. 7). If the user decides to add more funds, the system 200 again proceeds to decision step 268 of determining whether the timer has been exceeded through steps 264 and 266 as described above.

Returning now to FIG. 6 to step 240 of computing the charge to be debited to the associated user account, following the completion of step 240, decision step 272 is then implemented of determining if sufficient funds are available in the associated user account included within the account database 150*a* or 150*b*.

If no, step 274 is implemented of disabling the print device 102, e.g., via the processor 102*a* of the print device 102, followed by transfer to step 246 of informing the user 131, 132 or 133, e.g., via the print device 102, about insufficient funds available in the associated account and offering the user 131, 132 or 133 an opportunity to cancel the print job or deposit sufficient funds into the associated account and the succeeding steps are implemented as described above.

If yes, step 276 is implemented of debiting the charge computed in step 240 from the remaining value of the user account via the accounting software 156*a* or 156*b*. Step 278 is then implemented of enabling the print device 102 to proceed to implement the print job request. Decision step 280 is then implemented of determining whether the remaining value associated with the user account is greater than the minimum amount required to complete the print job.

If no, step 282 is implemented of printing the particular images or pages. Following step 282, step 283 is implemented of updating the job log and accounting counter. Then step 274 is implemented of disabling the print device 102 followed by transfer to step 246 as described above with respect to the steps following step 272.

If yes, step 284 is implemented of printing the images or particular page or image. Following step 284, step 286 is implemented of updating the job log (initiated in step 228—see FIG. 5) and updating the accounting counter (also initiated in step 228), e.g., via the accounting software 156*a* or 156*b*. Decision step 288 is then implemented of determining if there are more images to print. If yes, the system 100 transfers to decision step 234 where it is again determined whether there are any premium options associated with the user account and the subsequent steps implemented as described above. If no, the system 100 transfers to job cancellation condition N wherein steps 250 through 262 are implemented as described above (see FIG. 8).

Now returning to decision step 220 (see FIG. 5) wherein it is determined whether the accounting type is a “value” (e.g., financial limit, etc.) based account or a “count” (e.g., number or type of copies, etc.) based account, if the accounting type is a “count” type, step 290 is implemented of requesting and receiving count limits, e.g., the print device processor 102' requesting and receiving count limits from the EAS server 104. Following step 290, step 292 is implemented of creating, e.g., via the accounting software 156*a*, a temporary user account associated with the particular user in print device accounting database 150*a* of type “External” with “Limits” entry in limit table 158*a* and authorized services in “Services” Access Control List (ACL) 154*a*. Step 294 is then implemented of associating the newly created temporary user account with Group for “External”, e.g., via the accounting software 156*a*. Following step 294, step 296 is then implemented of updating all database tables, to contain new account details, after which, step 298 is implemented of displaying allowed services to the user 131 or 132 at the User Interface 140 (on the print device 102). The allowed services may include print, copy, scan, send facsimile. The user 131 or 132 may implement key stroking or other suitable data inputting methods.

Upon completion of step 298, the system 100 transfers to user service selection condition K. User service selection condition K includes step 300 of the user 131 or 132 selecting the service and programming the print job request, followed by step 302 of initiating job log collection.

Following step 302, the system 100 transfers into condition H that includes step 304 of updating the job log with job attributes, which is then followed by transfer to decision step 306 (see FIG. 7).

Referring to FIG. 7, in decision step 306, it is determined whether the count is within a percentage of a pre-established limit. If yes, monitoring condition L is implemented which includes step 308 of monitoring the number of images printed, e.g. via print device 102. In decision step 310, it is determined whether the number of images is greater than the count limit. If yes, step 312 is implemented of informing the user that the count limit has been exceeded, via the user interface 140. Following step 312, job cancellation condition N (see FIG. 8) is entered into by implementation of steps 250 through 262, as described above previously. Referring again to FIG. 7, in step 312, if it is determined that the count does not have a pre-established limit, the system 100 transfers into count update condition M. Count update condition M includes step 314 of printing the images followed by step 316 of updating the accounting counter, both steps 314 and 316 having been previously discussed above. Following step 316, decision step 318 is implemented of determining whether the print job is complete, e.g., via the accounting software 156*a*. If yes, the system 100 enters into job cancellation condition N (see FIG. 8) which again includes steps 250 through 262 as described above. If no, the system 100 transfers via transfer point H (see FIG. 5) to implement step 304 of updating job log with job attributes as described above previously.

Returning now to FIG. 8, following the completion of step 216 of the print device processor 102*a* identifying the account related to, or corresponding to, the user input and transferring via continuation point B (see FIG. 7), step 320 is implemented of requesting authorized services for the identified user account from a database on the print device 102, e.g., via account database 150*a*.

Following step 320, step 322 is implemented of displaying services allowed to the user on the user interface 140. Upon completion of step 322, user selection condition I is implemented which includes step 324 of the user 131 or 132 selecting the desired service, programming the print job request, and initiating the print job. Following step 324 of condition I, step 326 is implemented of updating count limits for each controlled attribute for the selected account from the Account Limits Table 158*a*. Upon completion of step 326, the system 100 transfers to monitoring condition L which includes step 308 of monitoring the number of images printed, and steps 310 and 312 as described above.

In view of the foregoing description referring to FIGS. 1-8, it can be appreciated that the present disclosure relates to the method 200 for integrated accounting for a print job that includes steps of providing at least one print device, e.g., print devices 102 and/or 112 and/or 122, having at least one database, e.g., databases 102*a*, 112*a* and 122*a*, respectively; and at least one server, e.g., EAS or partner server 104 or funds server 106, having at least one database, e.g., partner or EAS database 104*a* or funds server database 106*a*, respectively, and communicating between the at least one print device, e.g., print device 102 having at least one database 102*a* and the at least one server, e.g., EAS server 104 or funds server 106, via the network 110 for dynamically updating accounting information for the print job stored on at least one of the at least one database of the at least one print device, e.g., database 150*a* of print device 102, and the at least one database of the at least one server, e.g., the database 104*a* of the EAS server 104 or the database 106*a* of the funds server 106.

The method 200 may further include the at least one print device, e.g., print device 102, having at least one database, e.g., database 102*a*, communicating with the at least one server, e.g., the EAS server 104 or the funds server 106, via the network 110 for dynamically updating accounting information for the print job and dynamically creating a user account.

In addition, the method 200 may further include the at least one print device having at least one database, e.g., print device 102 having database 102*a*, communicating with the at least one server having at least one database, e.g., database 104*a* of EAS or partner server 104, or funds server database 106*a* of funds server 106 via the network 110 for dynamically updating accounting information for the print job and dynamically creating as the user account a temporary account included within at least one user account database, e.g., account database 150*a* or 150*b*, wherein the at least one user account database is one of the at least one database of the at least one print device and the at least one database of the server, e.g., database 102*a* of print device 102 and database 104*a* or 106*a* of EAS server 104 or funds server 106, respectively.

The method 200 may further include dynamically separating user authentication from user authorization included within at least one user account database, e.g., user account database 150*a* or 150*b*, wherein the at least one user account database is one of the at least one database of the at least one print device, e.g., print device database 102*a* of print device 102, and the at least one database of the server, e.g., database 104*a* or EAS server 104 or database 106*a* of funds server 106.

The method 200 may further include authenticating user information associated with the accounting information and at least one of dynamically requesting an amount of funds to initiate the print job be made available to the system 100, dynamically identifying cost of services for the print job, and dynamically identifying authorized services associated with the user account corresponding to the print job.

In addition, the method 200 further includes performing dynamic setting of user privileges corresponding to the user account. The method 200 may further include performing dynamic updating of at least one user account database, wherein the at least one user account database is one of the at least one database of the at least one print device and the at least one database of the server, e.g., databases 102*a*, 112*a* and/or 122*a* of print devices 102, 112, and/or 122, respectively, and the at least one database of the server, e.g., databases 104*a* and/or 106*a* of the server 104 and/or 106, respectively.

The method 200 may further include dynamically billing to at least one user account database, wherein the at least one user account database is one of the at least one database of the at least one print device and the at least one database of the server, e.g., databases 102*a*, 112*a* and/or 122*a* of print devices 102, 112, and/or 122, respectively, and the at least one database of the server, e.g., databases 104*a* and/or 106*a* of the server 104 and/or 106, respectively.

The method 200 may further include dynamically restricting dynamic billing to premium services associated with at least one user account database, wherein the at least one user account database is one of the at least one database of the at least one print device and the at least one database of the server, e.g., databases 102*a*, 112*a* and/or 122*a* of print devices 102, 112, and/or 122, respectively, and the at least one database of the server, e.g., databases 104*a* and/or 106*a* of the server 104 and/or 106, respectively.

The method 200 may further include dynamically restricting implementation of the print job to premium services associated with at least one user account database, wherein the at least one user account database is one of the at least one database of the at least one print device and the at least one database of the server, e.g., databases 102*a*, 112*a* and/or 122*a* of print devices 102, 112, and/or 122, respectively, and the at least one database of the server, e.g., databases 104*a* and/or 106*a* of the server 104 and/or 106, respectively.

The method 200 may further include dynamically counting page activity for the print job, with the page activity being associated with the temporary account.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A system for accounting for a print job comprising:

at least one print device having at least one database; and at least one server having at least one database;

wherein the at least one print device and the at least one server communicate via a network; at least one of said at least one print device and said at least one server having means for dynamically updating accounting information for the print job, the means for dynamically updating in operative communication with the at least one print device and with the at least one server via the network, the accounting information residing in at least one of the at least one database of the at least one print device and the at least one database of the at least one server, wherein the system integrates discrete, mutually exclusive accounting mechanisms comprising at least one of authentication using said print device or using an external accounting system server, authorization of funds and services available according to said authentication, and image counting into a single, dynamically selectable accounting mode system having the at least one dynamically updatable database of the at least one print device and/or the at least one server, wherein the at least one print device communicates with the at least one server via the network via at least one of the at least one print device and the at least one server dynamically creating a user account stored in at least one user account database.

2. The system according to claim 1, wherein the at least one print device communicates with the at least one server via the network via at least one of the at least one print device and the at least one server dynamically creating as the user account a temporary account included within said at least one user account database, wherein the at least one user account database is one of the at least one database of the at least one print device and the at least one database of the server.

3. The system according to claim 2, wherein the at least one print device communicates with the at least one server via the network via at least one of the at least one print device and the at least one server dynamically counting page activity comprising printed material output by said print device for the print job, the page activity being associated with the temporary account.

4. The system of claim 1, wherein the at least one print device communicates with the at least one server via the network via at least one of the at least one print device and the at least one server dynamically separating user authentication from user authorization included within at least one user account database, wherein the at least one user account database is one of the at least one database of the at least one print device and the at least one database of the server.

5. The system according to claim 1, wherein the at least one print device communicates with the at least one server via the network via at least one of the at least one print device and the at least one server authenticating user information associated with the accounting information and requesting an amount of funds to initiate the print job be made available to the system, identifying cost of services for the print job, and identifying authorized services associated with the user account corresponding to the print job.

6. The system according to claim 1, wherein the at least one print device communicates with the at least one server via the network for dynamically updating accounting information of a user account for the print job via at least one of the at least one print device and the at least one server performing dynamic setting of user privileges corresponding to the user account, wherein said privileges comprise setting permissions to copy, print, fax, use color, scan, set limits, and reset limits.

7. The system according to claim 1, wherein the at least one print device communicates with the at least one server via the network via at least one of the at least one print device and the at least one server performing dynamic updating of at least one user account database, wherein the at least one user account database is one of the at least one database of the at least one print device and the at least one database of the server.

8. The system according to claim 1, wherein the at least one print device communicates with the at least one server via the network via at least one of the at least one print device and the at least one server dynamically billing to at least one user account database, wherein in the at least one user account database is one of the at least one database of the at least one print device and the at least one database of the server.

9. The system according to claim 1, wherein the at least one print device communicates with the at least one server via the network via at least one of the at least one print device and the at least one server restricting dynamic billing to premium services associated with at least one user account database comprising at least one of large size paper, color paper, duplex printing, stapling, or hole punching, wherein the at least one user account database is one of the at least one database of the at least one print device and the at least one database of the server.

10. The system according to claim 1, wherein the at least one print device communicates with the at least one server via the network via at least one of the at least one print device and the at least one server dynamically restricting implementation of the print job to premium services associated with at least one user account database comprising at least one of large size paper, color paper, duplex printing, stapling, or hole punching, wherein the at least one user account database is one of the at least one database of the at least one print device and the at least one database of the server.

11. A method for accounting for a print job comprising:

providing:

at least one print device having at least one database; and at least one server having at least one database; and communicating between the at least one print device having at least one database and the at least one server having at least one database via a network for dynamically updating accounting information for the print job stored on at least one of the at least one database of the at least one print device and the at least one database of the at least one server;

wherein the method integrates discrete, mutually exclusive accounting mechanisms comprising at least one of authentication using said print device or using an external accounting system server, authorization of funds and services available according to said authentication, and image counting into a single, dynamically selectable accounting mode system having the at least one dynamically updatable database of the at least one print device and/or the at least one server, further comprising the at least one print device communicating with the at least one server via the network for dynamically updating accounting information for the print job;

dynamically creating a user account stored in at least one user account database.

12. The method according to claim 11, further comprising the at least one print device communicating with the at least one server via the network; and dynamically creating as the user account a temporary account included within said at least one user account database, wherein the at least one user account database is one of the at least one database of the at least one print device and the at least one database of the server.

13. The method according to claim 12, further comprising the at least one print device communicating with the at least one server via the network; and dynamically counting page activity comprising printed material output by said print device for the print job, the page activity being associated with the temporary account.

14. The method according to claim 11, further comprising the at least one print device communicating with the at least one server via the network; and dynamically separating user authentication from user authorization included within at least one user account database, wherein the at least one user account database is one of the at least one database of the at least one print device and the at least one database of the server.

15. The method according to claim 11, further comprising the at least one print device communicating with the at least one server via the network; and dynamically authenticating user information associated with the accounting information and dynamically requesting an amount of funds to initiate the print job be made available to the system, dynamically identifying cost of services for the print job, and dynamically identifying authorized services associated with the user account corresponding to the print job.

16. The method according to claim 11, further comprising the at least one print device communicating with the at least one server via the network; and performing dynamic setting of user privileges corresponding to the user account, wherein said privileges comprise setting permissions to copy, print, fax, use color, scan, set limits, and reset limits.

17. The method according to claim 11, further comprising the at least one print device communicating with the at least one server via the network; and performing dynamic updating of at least one user account database, wherein the at least one user account database is one of the at least one database of the at least one print device and the at least one database of the server.

18. The method according to claim 11, further comprising the at least one print device communicating with the at least one server via the network; and dynamically billing to at least one user account database, wherein the at least user account database is one of the at least one database of the at least one print device and the at least one database of the server.

19. The method according to claim 11, further comprising the at least on print device communicating with the at least one server via the network; and dynamically restricting dynamic billing to premium services associated with at least one user account database comprising at least one of large size paper, color paper, duplex printing, stapling, or hole punching, wherein the at least one user account database is one of the at least one database of the at least one print device and the at least one database of the server.

20. The method according to claim 11, further comprising the at least one print device communicating with the at least one server via the network; and dynamically restricting implementation of the print job to premium services associated with at least one user account database comprising at least one of large size paper, color paper, duplex printing, stapling, or hole punching, wherein the at least one user account database is one of the at least one database of the at least one print device and the at least one database of the server.

* * * * *